United States Patent [19]

Jorgensen

[11] 4,390,152
[45] Jun. 28, 1983

[54] AIRCRAFT DECOMPRESSION VENT ASSEMBLY

[75] Inventor: Bernard A. Jorgensen, Chatsworth, Calif.

[73] Assignee: Lockheed Corporation, Burbank, Calif.

[21] Appl. No.: 686,070

[22] Filed: May 13, 1976

[51] Int. Cl.³ .................. B64D 25/00; B64D 45/00
[52] U.S. Cl. .................. 244/118.5; 98/1.5; 98/119; 137/513.3; 244/117 R; 244/121; 244/129.1
[58] Field of Search ............ 244/118 R, 118 P, 119, 244/121, 117 R, 129.1; 137/513.3, 473, 527; 52/1, 98–100; 49/21, 31, 141; 98/1.5, 119, 95, 2.18, 74, 77, 79

[56] References Cited

U.S. PATENT DOCUMENTS

| 789,627 | 5/1905 | Pullman | 98/74 |
|---|---|---|---|
| 1,081,195 | 12/1913 | Austin | 98/95 |
| 2,194,878 | 3/1940 | Tracy | 98/119 |
| 2,679,467 | 5/1954 | Sherts | 244/121 |
| 2,925,050 | 2/1960 | Candlin et al. | 244/119 |
| 3,057,288 | 10/1962 | Pupsdorf | 98/119 |
| 3,938,764 | 2/1976 | McIntyre et al. | 244/118 P |
| 4,033,247 | 7/1977 | Murphy | 244/129.1 |
| 4,133,852 | 1/1979 | Di Nicolantonio et al. | 137/513.3 |

FOREIGN PATENT DOCUMENTS 2306877 11/1976 France ...................... 244/118.5

Primary Examiner—Galen L. Barefoot
Attorney, Agent, or Firm—Lowell G. Turner

[57] ABSTRACT

A vent assembly for rapidly depressurizing a compartment in an aircraft upon accidental depressurization of another compartment, including an apertured grille through which a circulation of return air normally passes, but which is mounted to swing into a hollow wall of the aircraft to pass a greatly increased flow of depressurizing air into the wall when desired. Two actuator plates are hinged together for differential pressure induced relative pivotal movement, and act upon such movement to swing the grille to its open or venting position. The hinged plates form a wall of a plenum chamber behind the grille, and the normal circulation of return air is so directed as to flow first through the grille, then through the plenum chamber, and then into the interior of the hollow wall beyond the plenum chamber to thereby assure positive and direct exposure of the plates to a change in compartment pressure.

21 Claims, 7 Drawing Figures

AIRCRAFT DECOMPRESSION VENT ASSEMBLY

BACKGROUND OF THE INVENTION

This invention relates to devices for automatically venting pressurized air from a compartment in aircraft in the event that the pressure in an adjacent compartment is accidentally lost in flight.

In a recent highly publicized aircraft accident, the pressure in a lower cargo compartment of the craft was accidentally released by loss of a cargo hatch in flight, following which the resultant differential pressure between a still pressurized upper passenger compartment and the depressurized lower compartment caused a separating deck to be deformed downwardly in a manner damaging control cables beneath the deck and eventuating in complete loss of control and an ultimate disastrous crash of the craft. Since that time, various expedients have been proposed for attempting to prevent repetition of the accident, by providing for the rapid venting of any such still pressurized compartment after accidental depressurization of another compartment, to thus avoid subjection of any intermediate deck or wall of the craft to possibly damaging differential pressures.

One such prior proposal of which I am aware utilizes an apertured return grille in the passenger compartment as a venting element, which under normal operating conditions passes a relatively light flow of return air from the passenger compartment into a hollow side wall of the compartment for discharge therefrom, and which under the discussed depressurization conditions swings automatically to a more open position in which a vastly increased volume of air can flow past the retracted grille for quickly discharging the pressurized air from the compartment. The grille in that arrangement is mounted pivotally at its upper edge to enable the lower edge of the grille to swing into the hollow wall. A pair of actuating plates are connected pivotally to the grille and to a support structure at spaced locations, and are connected pivotally to one another at an intermediate location, with the compartment pressure being communicated to these plates in a relation pressure actuating them to swing the grille to its retracted or open position in response to depressurization beyond the plates. In the normal position of the grill, the two plates are in slightly overcenter relative positions, for effectively locking the grille against unwanted opening movement except in response to development of a differential pressure across the plates in a depressurization situation.

SUMMARY OF THE INVENTION

The automatic depressurizing vents of the present invention are of the above discussed general type, including an apertured grille which is actuated from a normal position for passing return air through the grille to a retracted pressure venting position by the action of differential pressure against two swinging articulately interconnected actuating plates. A major purpose of the present invention is to provide an arrangement of this type in which the application of the actuating differential pressure to the swinging plates is more direct and effective, and can assure a more positive pressure induced actuation of these plates and the connected grille when depressurization of one compartment of the aircraft occurs. To attain this result, the equipment is formed to provide at the rear side of the swinging grille a plenum chamber, into which the normal flow of return air passes after moving through the apertures of the grille itself. This plenum chamber is formed in part by the two hinged actuating plates, which define a wall of the chamber to one side of which the chamber pressure is exposed. A passage or passages conduct the return air from the plenum chamber at a location downstream of the grille into the interior of the hollow wall of the aircraft for discharge therethrough. Thus, the plenum chamber itself is directly in the path of return air movement, as distinguished from the above discussed prior art device in which the return air bypasses the chamber through which actuating pressure is applied to the articulated plates.

A further object of the present invention is to provide a vent assembly of this general type in which the actuating plates fold relative to one another in a manner maximizing the angle through which the apertured grille may swing, and thereby increasing the air passing opening and the consequent rate at which air can flow through the vent assembly. For this purpose, the two plates swing upwardly, and more specifically the intermediate hinge which connects the two plates together moves upwardly relative to two other hinges which connect the plates at spaced locations to the grille and a support structure respectively, while the escaping air flows downwardly, all in a manner attaining the desired maximum air flow result. The mechanism of the invention also has an added advantage of causing the normal return air to follow a more circuitous path than in the above discussed prior art structure, to reduce the transmission of sound along that path between adjacent compartments, and thus minimize noise in the passenger compartment.

BRIEF DESCRIPTION OF THE DRAWINGS

The above and other features and objects of the invention will be better understood from the following detailed description of the typical embodiment illustrated in the accompanying drawings in which:

FIG. 5 is a horizontal section taken on line 5—5 of FIG. 4;

FIG. 7 is a horizontal section taken on line 7—7 of FIG. 2.

DESCRIPTION OF THE PREFERRED EMBODIMENT

Figure 1:
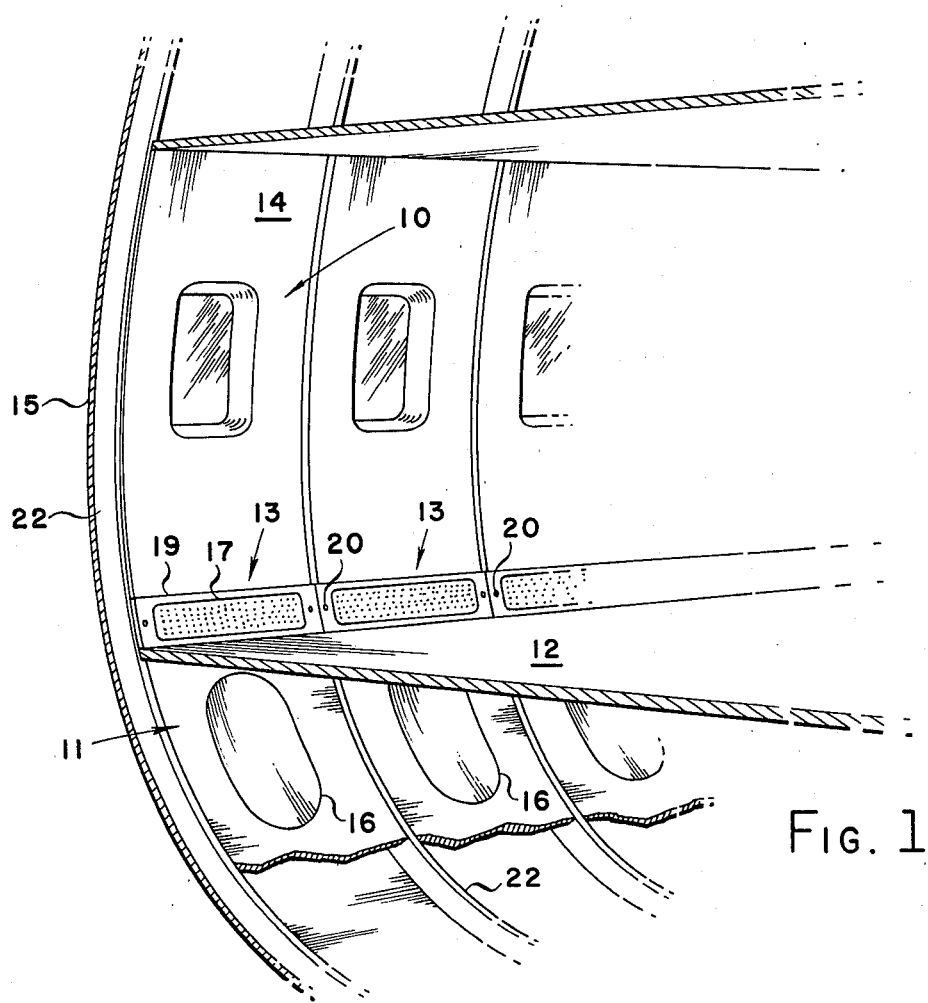
FIG. 1 is a fragmentary representation of the interior of an aircraft having automatic depressurizing vent assemblies constructed in accordance with the invention.
Figure 2:
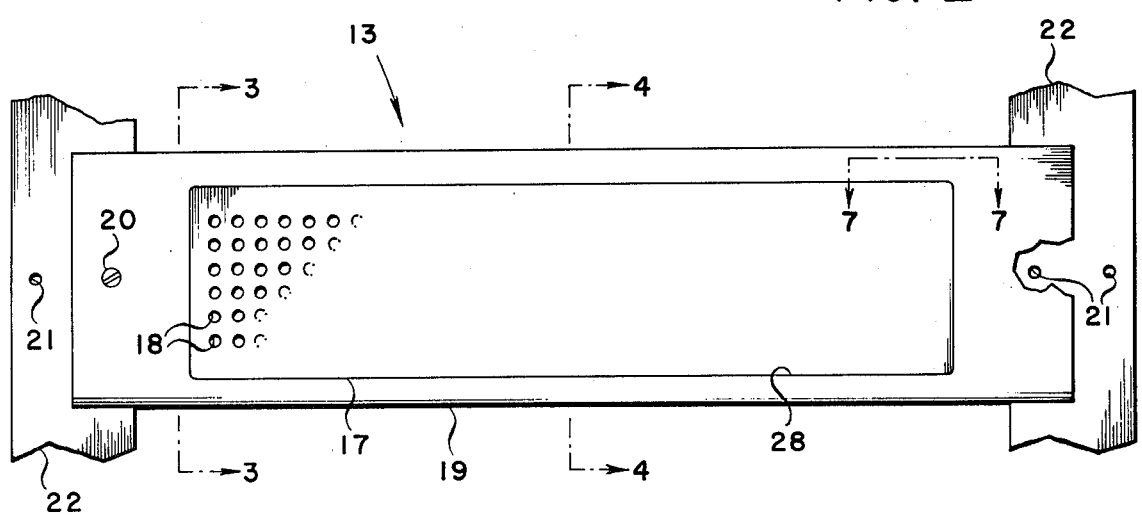
FIG. 2 is an enlarged front elevational view of one of the vent assemblies of FIG. 1.
Figure 3:
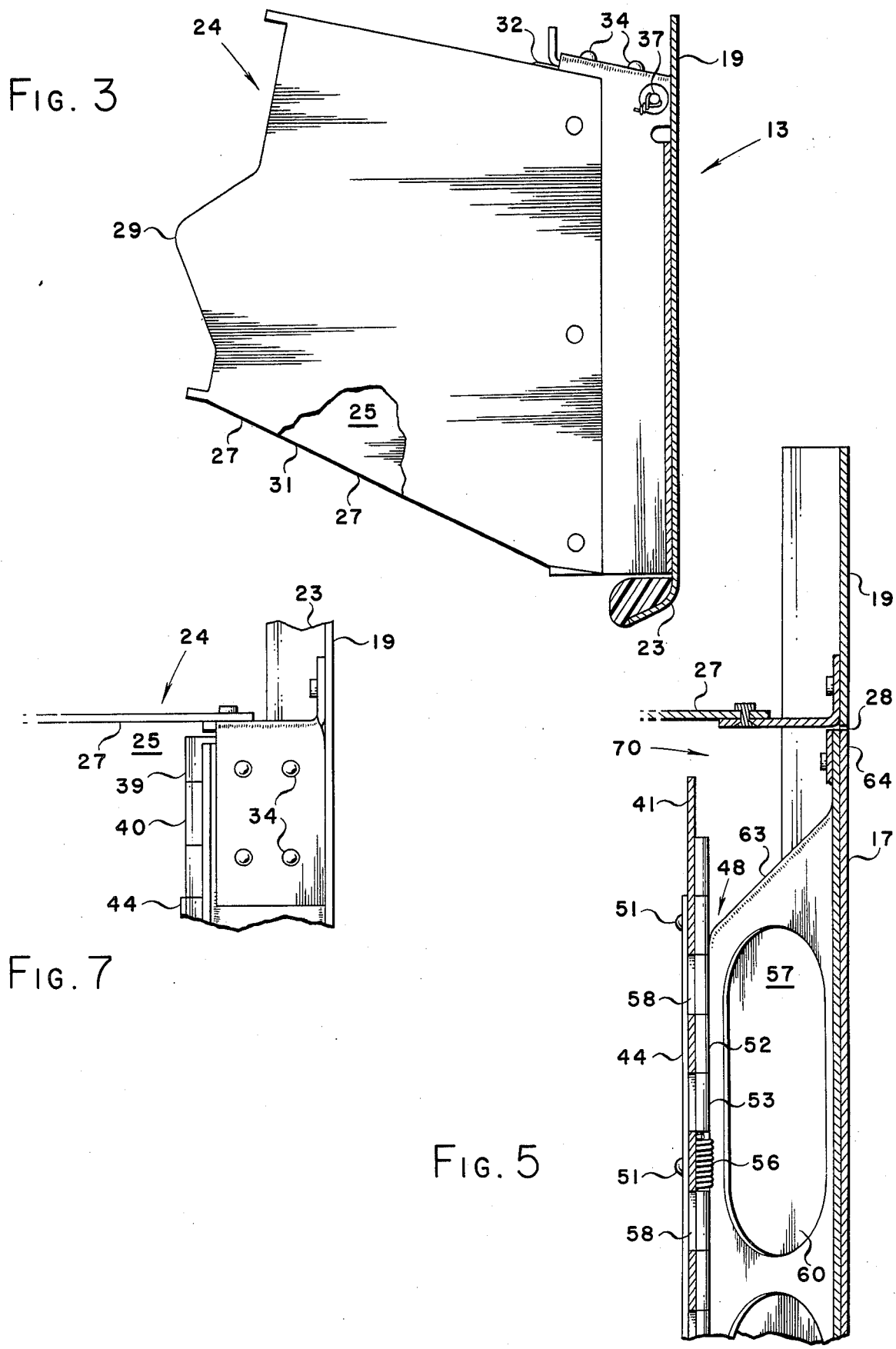
FIGS. 3 and 4 are vertical sections taken on lines 3—3 and 4—4 respectively of FIG. 2.

With reference first to FIG. 1, there is shown in that figure a side wall 10 of one of the passenger compartments of a pressurized high altitude commercial aircraft, which may typically be assumed to be a craft of the 'wide-bodied' type. A lower compartment represented at 11 is contained in the fuselage of the aircraft directly beneath the illustrated upper passenger compartment, and is separated from the passenger compartment by the usual horizontal deck structure 12. The illustrated lower compartment may be a cargo hold, or a lower level galley or the like. Both the upper and lower compartments are normally pressurized in flight, to essentially the same pressure substantially above that at the outside of the aircraft. In accordance with conventional practice, external air is continuously taken in, pressurized and conditioned as to temperature, and then injected into these compartments, and the 'return' air from these compartments is ultimately withdrawn and discharged back to the atmosphere.

Figure 4:
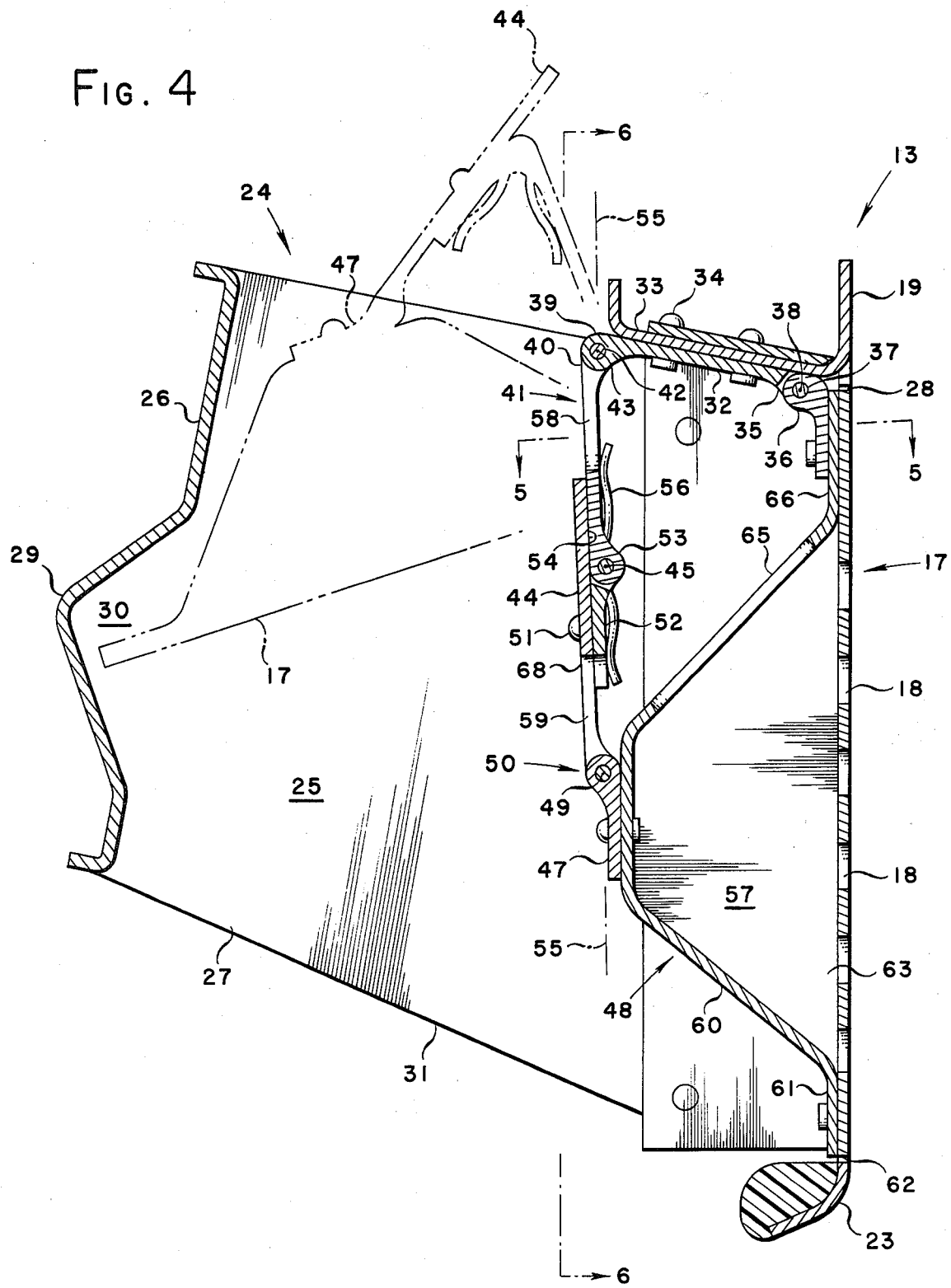

For serving the dual purposes of conducting this return air into the side wall of the craft, and in the event of depressurization of the lower compartment 11 passing a rapid flow of pressurized vent air from the upper compartment downwardly to the lower compartment, there are provided along the lower edges of the side walls 10 of the passenger compartment a series of safety vent assemblies 13, with whose construction the present invention is particularly concerned. As seen in FIG. 4, the side wall 10 of the aircraft is hollow, being defined by essentially parallel inner and outer skins 14 and 15 forming an inner space between the skins through which return and vent air can be conducted downwardly. Under normal pressurized flying conditions, the discussed return air flows downwardly through this space within the interior of the hollow side wall and ultimately discharges to the outside of the craft. When depressurization of the lower compartment occurs, a rapid flow of pressurized air from the upper compartment enters vent assemblies 13 and then flows downwardly through the space between the inner and outer skins of side walls 10, and may act to force blowout panels 16 in the inner skin (FIG. 1) inwardly into lower compartment 11 to thus quickly equalize the pressure between the upper and lower compartments and prevent damage to the deck 12 which might result from differential pressurization.

Each of the vent assemblies 13 includes a rectangular flat grille 17 which in its normal position of FIG. 1 (full line position of FIG. 4) lies in the plane of the inner skin 14 of side wall 10, and in effect forms essentially a continuation of that side wall. These grilles 17 contain a large number of apertures 18, typically circular as shown, distributed over almost the entire area of the grille and adapted to pass return air from the passenger compartment through the grille into the interior of the hollow side wall. Each grille is surrounded and carried by a rectangular frame 19, which is rigidly secured in fixed position to the side wall structure, desirably by two quarter turn fasteners or other quickly detachable fasteners 20 extending through frame 19 at its opposite ends and connecting detachably to coacting sockets 21 carried by the vertical frame members 22 to which the inner and outer skins of the aircraft are secured. Frame 19 may lie in essentially the same plane as inner skin 14 and the associated grille 17 except along the lower edge of the grille where the frame may curve in a manner illustrated at 23 in FIG. 4.

At its rear side, the frame 19 rigidly carries a structure 24 (FIG. 7), which defines with the frame a generally vertically extending air passage 25. More particularly, the structure 24 may include a generally vertical rear wall 26 spaced from the plane of frame 19 and located near the outer skin 15 of the aircraft, which compresses and isolates the sidewall insulation, with two parallel vertical opposite side walls 27 of the structure 24 extending forwardly toward frame 19 and connected rigidly to the frame at opposite ends of the rectangular grille receiving opening 28 in frame 19. The rear wall 26 of structure 24 may be deformed outwardly at 29 (FIG. 4) to form a horizontally elongated groove or recess 30 which partially receives the edge of grille 17 in its fully opened broken line position of FIG. 4. The lower end of structure 24 is open to form a rectangular outlet at 31 through which air discharges downwardly into the inter-skin space within the hollow wall of lower cargo compartment 11.

Near its upper edge, the rectangular frame 19 is bent rearwardly to form a horizontal top wall 33 (FIG. 4), which projects rearwardly from frame 19 along the entire extent of the upper edge of the rectangular grille receiving opening 28 in the frame, and which may be strengthened and reinforced by a generally horizontal plate-like member 32 secured by rivets 34 to top wall 33. This member 32 has at its forward edge a series of spaced hinge lugs 35 interfitting with similar spaced hinge lugs 36 attached to the upper edge of grille 17, with a hinge pin 37 extending through all of these lugs to form a piano hinge type of connection mounting grille 17 to member 32 and the connected frame 19 for swinging movement about a horizontal axis 38 between the full line normal position and broken line retracted position of FIG. 4.

At its rear edge, member 32 secured to frame 19 has a second series of spaced hinge lugs 39 interfitting with similar lugs 40 of an upper grille actuating plate 41 and a hinge pin 42 to connect plate 41 to member 32 for swinging movement about a second horizontal axis 43 between the full line and broken line positions of FIG. 4. A second and lower grille actuating plate 44 is pivotally connected to plate 41 for relative swinging movement about a horizontal axis, and at a lower edge is secured pivotally to a hinge part 47 for relative pivotal movement about another horizontal axis 49, with all of the axes 38, 43, 45, and 49 desirably being parallel to one another. As seen best in FIG. 6, the connection at 49 may be a piano hinge type connection 50 of the same type as that formed at the upper edge of plate 41. The central portion of plate 44 may be rigidly secured by fasteners 51 to a hinge element 52, having a piano hinge connection 53 with the lower edge of upper plate 41 defining the joint at pivotal axis 45. The upper extremity of plate 44 has a surface 54 which abuts against the outer surface of plate 41 in the FIG. 4 position to limit the pivotal movement of the plates at a slightly overcenter position, that is, at a position at which the intermediate hinge axis 45 between the two plates is slightly beyond a plane 55 containing the two axes 43 and 49. A spring 56 yieldingly urges the two plates to this overcenter position, and resists relative folding or pivotal movement of the plates and connected parts to the broken line position of FIG. 4.

Figure 6:
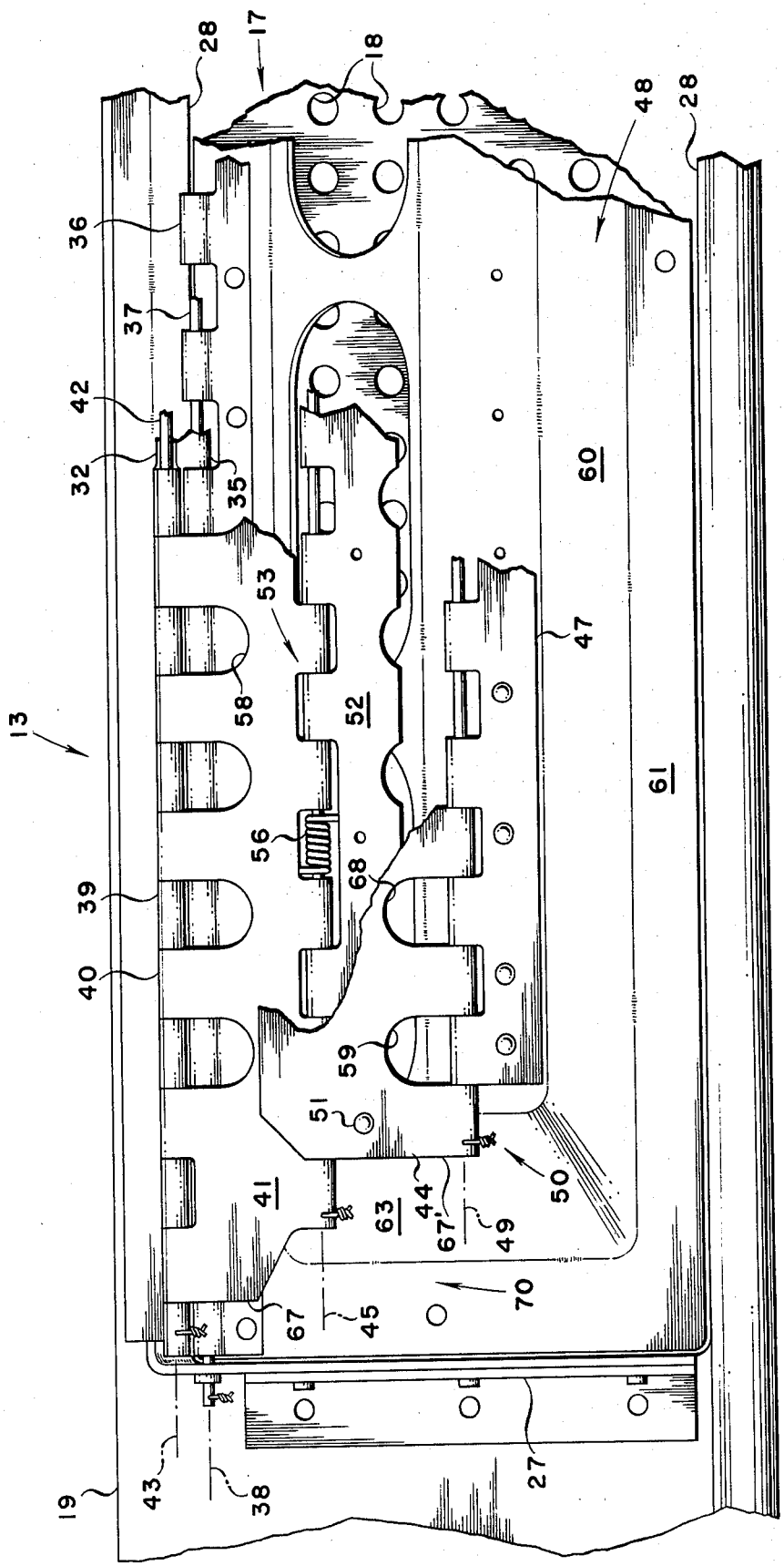
FIG. 6 is a view taken on line 6—6 of FIG. 4.

A hollow part 48 is connected to and projects rearwardly from the back side of grille 17, to form with other previously described parts of the apparatus a plenum chamber 57 into which air passing through the apertures 18 of the grille flows. The various elements forming this plenum chamber are so formed and related as to require that all such return air entering the chamber from the grille apertures can leave the plenum chamber only by flow past the ends of the articulately connected hinged plates 41 and 44, or by flow through two series of apertures 58 and 59 formed in the plates 41 and 44 near the upper and lower axes 43 and 49 (see FIG. 6). Part 48 is preferably shaped to have two oppositely sloping top and bottom walls 65 and 60, and a rear wall 66, and two angularly disposed opposite end walls 63, with the edge portions 61 of walls 65, 60 and 63 extending along and continuously peripherally engaging the corresponding edges 62 of grille 17 (beyond and entirely about all of the apertures 18). Part 48 is suitably rigidly secured to the grille, as by four screws 161 and 162 extending through the grille and connecting into mating sockets carried by part 48 at its opposite ends and near its top and bottom edges. All of the discussed walls of part 48 are closed to flow of air therethrough except for the upper wall 65, which contains apertures 67 through which air can flow upwardly to a space 69 in front of hinged plates 41 and 44. This space 69 and the interior of hollow part 48 form together the previously mentioned plenum chamber 57, whose top is defined by member 32. The hinged plates 41 and 44 preferably terminate somewhat short of the vertical end walls 27 of structure 24 (FIG. 6) to have end edges 67 and 67' which are spaced far enough from end walls 27 to allow some flow of return air from plenum chamber 57 through spaces 70 at the opposite ends of plates 41 and 44 and past those ends of the plates to their rear sides. As seen in FIG. 6, plate 44 may be somewhat shorter than plate 41. Air from plenum chamber 57 may also flow directly through apertures 58 and 59 in the hinged plates, which apertures may be formed between successive lugs of the corresponding hinges, and may be defined by edges curved semi-circularly at 68 as shown.

To now describe briefly the functioning of the illustrated apparatus, assume that initially the aircraft of FIG. 1 is in flight, and that its upper passenger compartment and lower cargo compartment 11 are pressurized substantially above the external ambient pressure. During such normal flight, the grilles 17 are in their closed positions of FIG. 1 (full line position of FIG. 4). In that condition, return air flows through the apertures 18 of each of the grilles 17, into the plenum chamber 57 behind the grille, and is confined by that plenum chamber in a relation requiring it to flow essentially upwardly toward the upper portion of the chamber and then discharge from the chamber to the rear side of the plates 41 and 44 by flow past the ends of the plates and through their apertures 58 and 59. After thus reaching the space at the rear of plates 41 and 44, the return air passes downwardly to discharge from each of the vent assemblies 13 through its lower outlet 31, from which the air passes downwardly into the hollow wall structure of the lower compartment 11, for ultimate discharge from that space to the exterior of the craft through a conventional pressure controlling valve or valves. Spring 56 has sufficient strength to maintain the plates 41 and 44 in their slightly overcenter positions against any relatively slight tendency which the slow moving return air in plenum chamber 57 might otherwise have for releasing these plates from their overcenter positions. Thus, the overcenter plates act effectively to lock grille 17 in its closed position, even though a passenger may accidentally contact and exert force against the grille. Further, the rather circuitous path along which the return air must flow in passing through the vent assemblies is such as to interfere with direct transmission of sound from the lower compartment to the upper compartment and thus minimize noise in the passenger compartment.

In the event that the lower compartment 11 is for any reason suddenly depressurized, as for instance by loss of a hatch cover, this sudden depressurization of the lower compartment 11 creates a high differential pressure across each of several of the blowout panels 16 in the inner skin of the wall of that compartment, causing those panels to blow into compartment 11 and open large apertures through which air may enter compartment 11 from the interior of the side wall. This reduced pressure condition is communicated upwardly through the interior of the side wall to the back side of the grille actuating plates 41 and 44 of each of the vent assemblies 13, with the result that the pressure differential across these plates quickly forces the plates and particularly their intermediate hinge connection rearwardly, causing the plates and connected grilles and structures 48 to swing rearwardly and upwardly to the broken line position of FIG. 4. The relatively small air flow passages 58, 59 and 70 extending through and past the ends of plates 41 and 44 are much too restricted to pass enough air to relieve the high differential pressure under the discussed depressurization condition. In the fully opened broken line position of FIG. 4, the grille allows very free flow of large volumes of air through the rectangular opening in frame 19 and downwardly through outlet 31, at a rate equalizing the pressure at the upper and lower sides of deck 12 so rapidly as to prevent downward deformation or bulging of that deck by the pressure in the cabin. Structural damage to the aircraft and particularly to deck 12 and any control cables or the like located beneath that deck is effectively prevented, and the pilot still retains control of the craft in spite of the depressurization condition. The manner in which the grille actuating plates 41 and 44 fold or swing upwardly as the grille retracts assists in minimizing the space effectively occupied by the swinging parts, and in maximizing the amount of air which can be conducted through the equipment for a given size grille.

While a certain specific embodiment of the present invention has been disclosed as typical, the invention is of course not limited to this particular form, but rather is applicable broadly to all such variations as fall within the scope of the appended claims.

I claim:
1. Apparatus for venting pressurized air through a hollow wall of a pressurized compartment of an aircraft, comprising:
  a mounting structure;
  an apertured return air grille hinged to said mounting structure for swinging movement from a first position in which a light flow of return air passes through the grille to a second more open position in which a greatly increased flow of vent air can enter the hollow wall past the grille, and
  means forming a plenum chamber behind said grille into which said light flow of return air passes after flowing through the grille, said means including two swinging grille actuating plates forming a wall of said plenum chamber and hinges connecting said plates to the mounting structure and grille respectively at two spaced locations and to each other at an intermediate location, in a relation to swing said grille from said first position to said second position in response to a reduction in pressure at a downstream side of the plates;
  there being a passage or passages through which said return air can discharge from said plenum chamber at a location downstream of the grille, so that said light flow of return air follows a path first through the grille, then through the plenum chamber, and then through said passage or passages into the interior of said hollow wall for discharge therefrom.
2. Apparatus as recited in claim 1, in which said passage or passages are formed in at least one of said swinging grille actuating plates.

3. Apparatus as recited in claim 1, in which said passage or passages include two series of apertures formed in said two swinging grille actuating plates respectively.

4. Apparatus as recited in claim 1, in which said passage or passages include two series of apertures formed in said two swinging grille actuating plates respectively and extending essentially along two of said hinges at said two spaced locations.

5. Apparatus as recited in claim 1, in which said grille extends essentially vertically at said side of the compartment and is hinged at an upper edge thereof for swinging movement of a lower edge of the grille into said hollow wall.

6. Apparatus as recited in claim 1, in which said two swinging plates are in a slightly overcenter position when said grille is in said first position thereof.

7. Apparatus as recited in claim 1, in which said two swinging plates are in a slightly overcenter position when said grille is in said first position thereof, there being means yieldingly resisting relative swinging movement of said two grille actuating plates from said slightly overcenter position.

8. Apparatus as recited in claim 1, including means yieldingly urging said two swinging plates pivotally relative to one another in a direction tending to return said grille to said first position thereof.

9. Apparatus as recited in claim 1, in which said means forming said plenum chamber include a hollow air confining structure mounted to the rear side of said grille to receive air therefrom and having an opening through which air discharges toward said swinging plates.

10. Apparatus as recited in claim 1, in which said means forming said plenum chamber include a hollow air confining structure mounted to a rear side of said grille and to which one of said plates is connected pivotally by one of said hinges.

11. Apparatus as recited in claim 1, in which said means forming said plenum chamber include a hollow air confining structure mounted to a rear side of said grille for swinging movement therewith and having an upper outlet opening through which air flows to said plates to act thereagainst.

12. Apparatus as recited in claim 1, in which said means forming said plenum chamber include a hollow air confining structure mounted to a rear side of said grille for swinging movement therewith and having an upper outlet opening through which air flows to said plates to act thereagainst, one of said hinges connecting one of said plates to said hollow air confining structure at a lower location, and the other of said hinges connecting the other of said plates to said mounting structure at a location spaced above said lower location.

13. Apparatus as recited in claim 12, in which said passage or passages through which air leaves the plenum chamber include two series of apertures formed in said two swinging grille actuating plates respectively.

14. Apparatus as recited in claim 13, in which said two plates are in a slightly overcenter position when said grill is in said first position thereof, there being spring means yieldingly retaining said two plates in said slightly overcenter position.

15. Apparatus as recited in claim 14, in which said grille is hinged at an upper edge thereof for swinging movement about an essentially horizontal axis between said different positions of the grille, said hinges including three hinges having horizontal axes essentially parallel to said first mentioned horizontal axis of the grille.

16. Apparatus as recited in claim 1, in which said passage or passages include a flow space beyond an end of said plates through which said return air may flow past said end of the plates.

17. Apparatus as recited in claim 1, in which said passage or passages include apertures through said plates, and flow spaces beyond opposite ends of the plates through which return air may flow past said ends of the plates.

18. Apparatus for venting pressurized air through a hollow side wall of a pressurized compartment of an aircraft, comprising:

an apertured return air grille at a side of the compartment;

first hinge means connecting said grille at an upper edge thereof to said mounting structure for swinging movement into said side wall of the compartment from a first generally vertically extending position of the grille in which a light flow of return air passes through the grille to a second more open position in which a greatly increased flow of vent air can enter the side wall past a lower edge of the grille;

two swinging grille actuating plates;

second and third hinge means connecting said two plates to said mounting structure and said grille respectively for relative swinging movement about spaced generally horizontal axes; and fourth hinge means pivotally connecting said two plates to one another at an intermediate location for relative swinging movement about a fourth axis in a relation to swing said grille from said first position thereof to said second position in response to a reduction in pressure at a downstream side of the plates;

said hinge means and plates being interconnected in a relation causing said fourth hinge means and its axis to retract upwardly relative to said second and third hinge means and their axes upon swinging movement of said grille from said first position thereof to said second and more opened position of the grille.

19. Apparatus as recited in claim 18, in which said two plates extend essentially vertically in a slightly overcenter position when said grille is in said first position thereof.

20. Apparatus as recited in claim 18, including a hollow air confining plenum element connected to a rear side of said grille for swinging movement therewith and to which one of said hinge means is attached.

21. Apparatus as recited in claim 18, in which said mounting structure includes a frame disposed about said grille and relative to which the grille swings, and a downwardly and upwardly opening duct projecting rearwardly from the frame and into which said grille swings rearwardly and containing said plates and said second, third and fourth hinge means.

* * * * *